(No Model.)
D. OCHSE & J. A. MALONE.
LOCOMOTIVE BELL RINGER.
No. 548,084.   Patented Oct. 15, 1895.
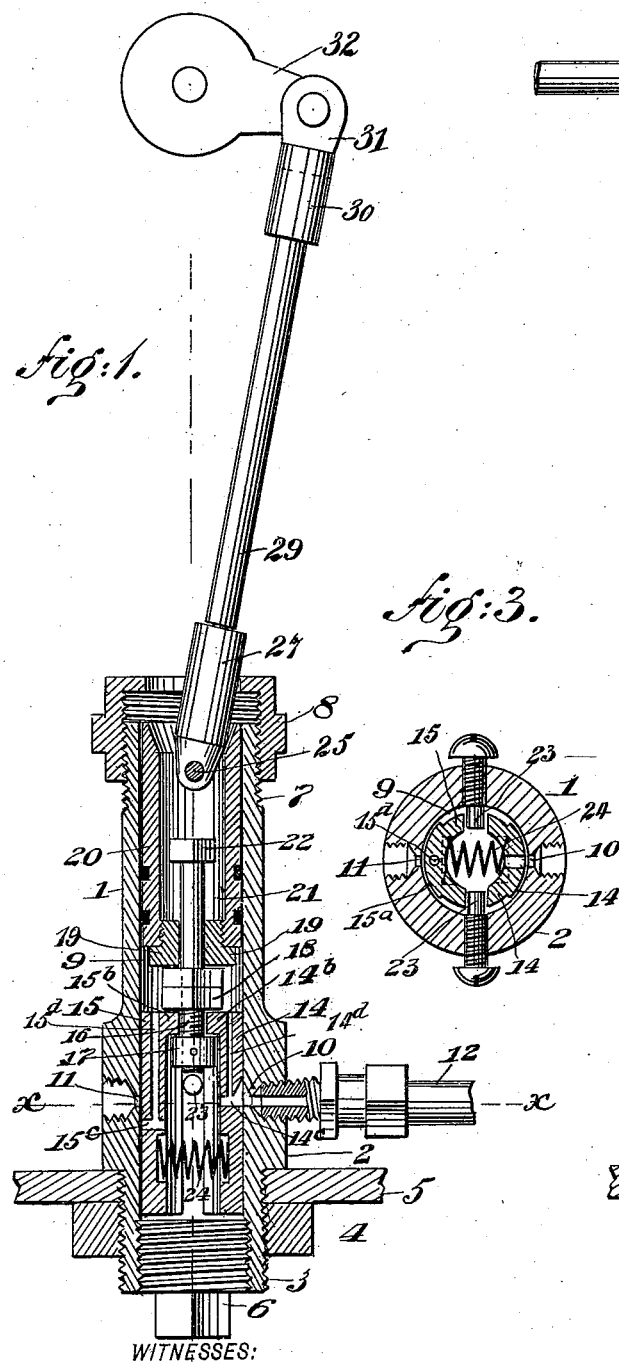
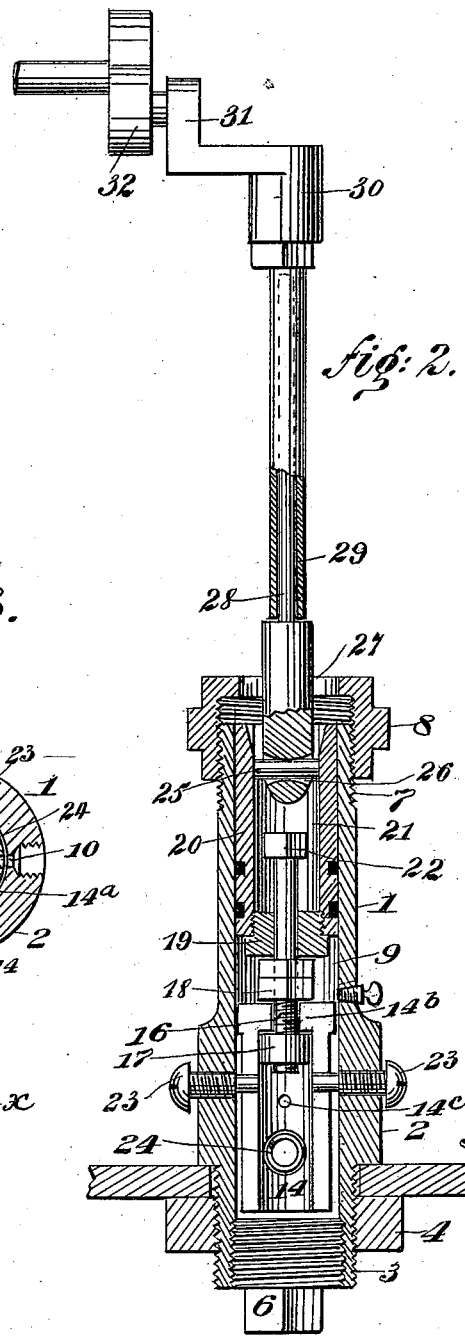
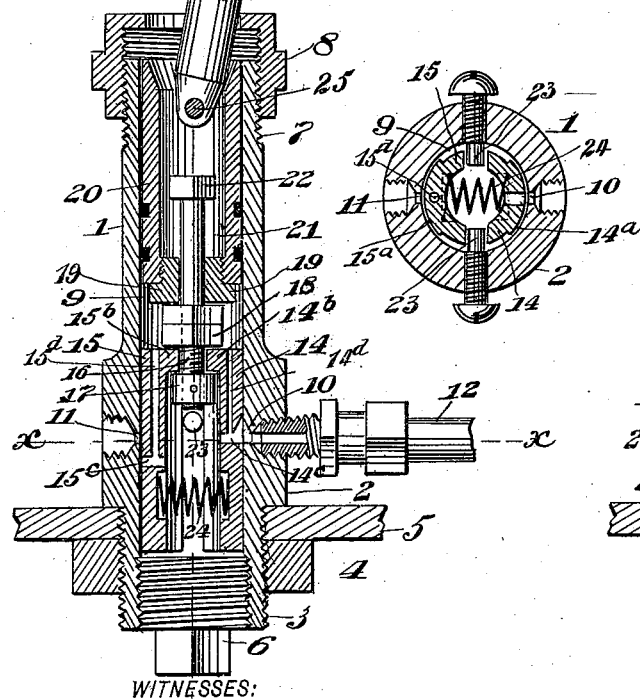
WITNESSES:
Chas. Nida
J. D. Caplinger
INVENTORS:
D. Ochse
J. A. Malone
BY
Munn
ATTORNEYS.

UNITED STATES PATENT OFFICE.

DANIEL OCHSE, OF ONEONTA, AND JOHN A. MALONE, OF ALBANY, NEW YORK.

LOCOMOTIVE BELL-RINGER.

SPECIFICATION forming part of Letters Patent No. 548,084, dated October 15, 1895.

Application filed July 11, 1895. Serial No. 555,634. (No model.)

*To all whom it may concern:*

Be it known that we, DANIEL OCHSE, of Oneonta, in the county of Otsego, and JOHN A. MALONE, of Albany, in the county of Albany, State of New York, have invented certain new and useful Improvements in Locomotive Bell-Ringers, of which the following is a full, clear, and exact description.

This invention relates to certain improvements in bell-ringing devices especially adapted for use on locomotive-engines for ringing the bell to give warning of the approach of a train drawn by the locomotive; and the object of the invention is to provide a bell-ringer of a simple and inexpensive character which shall be adapted to be actuated by fluid pressure, as compressed air or steam, whereby the device may be conveniently and continuously operated without any action on the part of the engineer or fireman other than turning on or off the air or steam supply.

The invention consists in a cylinder having inlet and exhaust ports for the compressed air or steam, a valve arranged in the cylinder and consisting of two spring-actuated sections adapted to control said ports, a piston in the cylinder connected to the bell-crank and adapted to ring the bell when moved, and a connection between the piston and valve whereby the latter is actuated from the former to open and close the inlet and exhaust ports of the cylinder.

The invention also contemplates certain novel features of construction and combinations and arrangements of the several parts of the device whereby certain important advantages are attained and the device is made simpler, more durable, and otherwise better adapted for use than other bell-ringers heretofore devised, all as will be hereinafter fully set forth.

The novel features of the invention will be carefully defined in the claims.

Reference is to be had to the accompanying drawings, forming a part of this specification, in which similar characters of reference indicate corresponding parts in all the figures.

Figure 1 is a sectional view taken axially through the cylinder of the device, showing the piston and valve in their lowermost positions. Fig. 2 is a sectional view similar to Fig. 1, but taken at right angles to the plane of the section in said figure; and Fig. 3 is a transverse section taken through the cylinder of the device and the valve therein in the plane indicated by the line $x\ x$ in Fig. 1.

In the drawings, 1 represents the cylinder of the device, which is provided with an enlarged lower part 2, the under side of which forms a shoulder, below which the cylinder is reduced and screw-threaded, as seen at 3, to receive a nut 4, between which and the shoulder at the under side of the enlarged portion 2 of the cylinder is clamped a bracket 5, which is secured to the locomotive and forms a support for the bell-ringing device.

The cylinder 1 is open at opposite ends, being closed at its lower end by means of a screw-plug 6 or equivalent device adapted for ready removal when it is desired to cleanse the cylinder, and at its upper end said cylinder is exteriorly screw-threaded, as seen at 7, to receive a screw-cap 8, having a central perforation corresponding in diameter to that of the bore 9 of the cylinder.

The cylinder is provided at diametrically-opposite sides of its enlarged lower part 2 with inlet and exhaust ports 10 and 11, respectively, connecting with its bore 9, and said ports are adapted to be connected in any preferred way with air or steam pipes 12 for supplying the air or steam for working the device and are controlled by a valve consisting of two sections or parts 14 and 15, having faces $14^a$ and $15^a$ projecting from their outer sides and adapted to work over the respective ports 10 and 11, respectively, the sections 14 and 15 of the valve being provided with ports $14^c$ and $15^c$ in said faces $14^a$ and $15^a$, adapted to coincide with the cylinder-ports 10 and 11, so as to admit and exhaust the air or steam when said valve is reciprocated, as will be presently described.

The sections or parts 14 and 15 of the valve are provided with overhanging inturned flanges $14^b$ and $15^b$ at their upper ends, and said flanges are adapted when the parts of the device are assembled to be engaged and held between a head 17, secured to the lower end of a valve-stem 16, which is screw-threaded, as clearly seen in Figs. 1 and 2, and a nut 18, mounted on said screw-threaded stem above the flanges 14ᵇ and 15ᵇ and held in position by means of a lock-nut, as clearly seen in the drawings.

The upper end of the valve-stem 16 extends and plays through an aperture formed centrally in a screw-cap 19, screwed into the open lower end of a piston 20, of tubular form, in the bore 21 of which the head 22 of the said valve-stem 16 is arranged. The parts or sections 14 and 15 of the valve are guided in their reciprocating movements in the cylinder 1 and are prevented from turning therein by means of guide screws or pins 23, set in the sides of the cylinder 1 and projecting into the bore 9 between said parts or sections 14 and 15, and at their lower ends said parts or sections are provided on their inner adjacent faces with sockets serving to receive and hold the ends of a spring 24, whereby the valve-sections are held firmly pressed up against the opposite walls of the cylinder.

At its upper end the tubular piston 20 is provided with a pin 25, extending across it, on which pin 25 is pivoted the head 27 of a connecting-rod 28, said head 27 being provided with a perforation 26, extending through it to receive said pin 25. The head 27 is of less diameter than the bore 21 of piston 20, and the ends of the perforation 26 are enlarged, so that a universal joint or connection is provided between the connecting-rod 28 and the piston 20, and said rod 28 is arranged to pass through a sleeve 29, secured at its upper end to a head 30, having an arm 31, adapted to be connected to the bell-crank 32, as clearly seen in the drawings.

Each of the ports 14ᶜ and 15ᶜ is made to extend through the valve-section wherein it is formed, and is also made to communicate with a passage formed longitudinally through the said valve-section, as seen at 14ᵈ 15ᵈ in Fig. 3, and opening at the upper side of the valve-section under the lower end of the piston 20, and, as clearly seen in Fig. 1, the inlet-port 14ᶜ in section 14 is formed above the plane of the exhaust-port 15ᶜ in valve-section 15, whereby when the valve is moved upward in the cylinder the inlet-port 10 will be closed and the exhaust 11 opened, and when the valve is moved in the reverse direction the exhaust-port will be closed and the inlet-port opened.

The operation of the device is as follows: When compressed air or steam is admitted at the inlet-port 10 of the cylinder 1, it passes through the port 14ᶜ of valve-section 14, the valve being then in the position seen in Figs. 1 and 2, into the interior of the valve and also through the branch 14ᵈ upward into the space between the piston 20 and the valve, causing said piston 20 to rise, so as to actuate the bell-crank 32 and rock the bell of the locomotive. As the piston 20 moves upward the head 22 of valve-stem 16 comes to bear on the cap 19 and causes the valve to move upward in unison with the piston 20, thereby closing the inlet-port 10 of the cylinder and opening the exhaust-port 11, the exhaust-port 15ᶜ in valve-section 15 being, as above stated, at a lower level than the inlet-port 14ᶜ, whereby the compressed air or steam is allowed to escape from the cylinder, as will be readily understood. The pressure being thereby removed from below the piston 20, the weight of the bell exerted through the connection between the bell-crank 32 and piston 20 causes said piston to fall in the cylinder until its lower end engages the lock-nut on stem 16, whereupon the valve carried on said stem is also moved down sufficiently by the weight of the bell to close the exhaust-port 11 in the cylinder and to open the inlet-port 10 therein, so that air or steam may again enter the same to raise the piston 20 and rock the bell.

The construction of the device as above set forth is extremely simple and inexpensive and is not liable to be deranged or broken while in use, nor are the parts liable to become worn, so as to require frequent renewal. The valve-sections 14 and 15, being made with narrow faces at the ports and being pressed against the opposite sides of the cylinder by means of springs, take up all wear and automatically adjust themselves to prevent leakage at either of the ports, and the piston 20 is of such a nature as to permit of being packed and its packing renewed at intervals, so as to prevent leakage at the upper end of the cylinder.

If steam be used as the medium for working the device, it is obvious that the water of condensation will collect at the base of the cylinder and will be discharged through the exhaust-port 11 of the cylinder should it rise sufficiently high, so that the device will not be rendered inoperative by such condensation, and it will also be seen that when the steam or air is cut off to stop the operation of the device the weight of the bell will automatically return the valve to its lowered position, so that when air or steam is again supplied the device will operate properly.

The connection between the bell-crank 32 and the piston 20 of the device is such that even though the bell should turn completely over the device will still be operative, since the rod 28 will simply slide through the sleeve 29, and the construction of this part permits ready adjustment of the device to bells having cranks of different throw, it being only necessary to cut off the sleeve 29 more or less, as may be required.

It will be evident from the above description of our improved bell-ringing device that the same is susceptible of considerable modification without material departure from the principles and spirit of our invention, and for this reason we do not wish to be understood as limiting ourselves to the exact form of the device as herein set forth.

Having thus described our invention, we claim as new and desire to secure by Letters Patent—

1. In a bell ringing device, the combination of a cylinder having inlet and exhaust ports, a piston in said cylinder adapted to be connected to the bell to be rung, and a valve in the cylinder connected to and operated from said piston and comprising two sections having means for holding them against the cylinder walls in position to close the ports therein, substantially as set forth.

2. In a bell ringing device, the combination of a cylinder having inlet and exhaust ports, a piston in said cylinder, adapted to be connected to the bell to be rung, and a valve in said cylinder, connected to and operated from said piston and comprising two spring-actuated sections adapted to be pressed in opposite directions against the cylinder walls, substantially as set forth.

3. In a bell ringing device, the combination of a cylinder having inlet and exhaust ports, a piston in said cylinder, adapted to be connected to the bell to be rung, a valve in said cylinder, consisting of two parts, a spring between said parts adapted to hold them pressed against the opposite sides of the cylinder, and a sliding connection between said piston and valve, whereby a portion of the movement of the former is transmitted to the latter, substantially as set forth.

4. In a bell ringing device, the combination of a cylinder having inlet and exhaust ports, a piston in said cylinder, connected to the bell to be rung, a valve in the cylinder, consisting of two parts, a spring between said parts adapted to hold them pressed against opposite sides of the cylinder, and a valve stem having connection at one end to the valve and having at its other end sliding connection with said piston, substantially as set forth.

5. In a bell ringing device, the combination of a cylinder having inlet and exhaust ports, a piston in said cylinder adapted to be connected to the bell to be rung, a valve stem having sliding connection at its upper end to said piston and having its lower end screw threaded and provided with a head, a nut screwing on the threaded end of the stem, and a valve arranged to control the cylinder ports and consisting of sections having flanges held between the nut and head of the stem, substantially as set forth.

DANIEL OCHSE.
JOHN A. MALONE.

Witnesses:
L. F. PUTNAM,
W. J. PALMER.